(12) United States Patent
Xu (10) Patent No.: US 11,956,666 B2
(45) Date of Patent: Apr. 9, 2024

(54) HARQ PROCESS DETERMINATION METHOD, NETWORK DEVICE AND TERMINAL

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 400 days.

(21) Appl. No.: 17/344,447

(22) Filed: Jun. 10, 2021

(65) Prior Publication Data
US 2021/0306110 A1 Sep. 30, 2021

Related U.S. Application Data

(63) Continuation of application No. PCT/CN2018/124502, filed on Dec. 27, 2018.

(51) Int. Cl.
*H04L 1/1812* (2023.01)
*H04L 1/1822* (2023.01)
(Continued)

(52) U.S. Cl.
CPC ........... *H04W 28/04* (2013.01); *H04L 1/1812* (2013.01); *H04L 1/1822* (2013.01); *H04L 1/1861* (2013.01); *H04L 1/1893* (2013.01); *H04L 5/0055* (2013.01); *H04L 5/0076* (2013.01); *H04L 5/0092* (2013.01);
(Continued)

(58) Field of Classification Search
CPC . H04L 1/08–1896; H04L 5/003–0098; H04W 8/18–245; H04W 24/02–10; H04W 28/02–26; H04W 48/02–20; H04W 56/0005–0025; H04W 72/02–569; H04W 74/002–02;
(Continued)

(56) References Cited

U.S. PATENT DOCUMENTS

2018/0049229 A1 2/2018 Dinan et al.
2018/0176945 A1 6/2018 Cao
(Continued)

FOREIGN PATENT DOCUMENTS

CN 101686116 A 3/2010
CN 107332646 A 11/2017
(Continued)

OTHER PUBLICATIONS

Supplementary European Search Report in the European application No. 18944151.2, dated Nov. 4, 2021. 8 pages.
(Continued)

*Primary Examiner* — Timothy J Weidner
(74) *Attorney, Agent, or Firm* — PERKINS COIE LLP (57) ABSTRACT

An embodiment of the present application discloses an HARQ process determination method, a network device and a terminal. The method comprises: the terminal determines HARQ process resource parameters; the terminal determines currently transmitted HARQ process resources on the basis of the HARQ process resource parameters; wherein, the current transmission is a non-dynamic transmission.

16 Claims, 3 Drawing Sheets

```
┌─────────────────────────────────────────────────┐
│   The terminal determines an HARQ process       │  201
│           resource parameter                    │
└─────────────────────────────────────────────────┘
                       │
                       ▼
┌─────────────────────────────────────────────────┐
│   The terminal determines an HARQ process       │
│  resource for a transmission based on the HARQ  │  202
│  process resource parameter; the transmission   │
│          is a non-dynamic transmission          │
└─────────────────────────────────────────────────┘
```

(51) Int. Cl.
  *H04L 1/1829* (2023.01)
  *H04L 1/1867* (2023.01)
  *H04L 5/00* (2006.01)
  *H04W 28/02* (2009.01)
  *H04W 28/04* (2009.01)
  *H04W 72/11* (2023.01)
  *H04W 72/115* (2023.01)
  *H04W 72/23* (2023.01)
  *H04W 72/512* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ....... *H04L 5/0094* (2013.01); *H04W 28/0205* (2013.01); *H04W 72/11* (2023.01); *H04W 72/115* (2023.01); *H04W 72/23* (2023.01); *H04W 72/512* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ..... H04W 84/02–16; H04W 88/02–12; H04W 92/02–04; H04W 92/10
  See application file for complete search history.

(56) References Cited

U.S. PATENT DOCUMENTS

| | | |
|---|---|---|
| 2019/0090269 A1 | 3/2019 | Cao |
| 2019/0159251 A1 | 5/2019 | Li et al. |
| 2020/0112402 A1* | 4/2020 | Ai .................... H04W 72/0446 |
| 2021/0378006 A1* | 12/2021 | Takeda ................. H04W 72/23 |
| 2022/0039144 A1* | 2/2022 | Alabbasi ............... H04W 72/23 |

FOREIGN PATENT DOCUMENTS

| | | |
|---|---|---|
| CN | 108811114 A | 11/2018 |
| WO | 2018107944 A1 | 6/2018 |
| WO | 2018228540 A1 | 12/2018 |

OTHER PUBLICATIONS

Written Opinion of the International Search Authority in the international application No. PCT/CN2018/124502, dated Sep. 2, 2019. 6 pages with English translation.

First Office Action of the European application No. 18944151.2, dated Jun. 30, 2022 (5 pages).

International Search Report in the international application No. PCT/CN2018/124502, dated Sep. 2, 2019.

\* cited by examiner

FIG. 10

# HARQ PROCESS DETERMINATION METHOD, NETWORK DEVICE AND TERMINAL

CROSS-REFERENCE TO RELATED APPLICATION

This is a continuation application of International Patent Application No. PCT/CN2018/124502, filed on Dec. 27, 2018, the contents of which are hereby incorporated by reference in its entirety.

TECHNICAL FIELD

The present disclosure relates to the field of wireless communication technology, and in particular to a method for determining a hybrid automatic repeat request (HARQ, Radio Resource Control) process, a network device, and a terminal.

BACKGROUND

The current 5G system introduces Ultra-Reliable Low Latency Communication (URLLC), which is characterized by ultra-reliable (e.g., 99.999%) transmission within a very short latency (e.g., 1 ms). To achieve this goal, the concept of configured grant was proposed. Configured grant uses a pre-configured/a semi-persistent state resource configuration manner, and the terminal can perform a transmission on the configured resources according to the service requirements. This technology avoids processes of the Schedule Request (SR) and the Buffer Status Report (BSR), and increases the effective transmission time of the terminal.

Configured grant and Grant based share HARQ processes, and the HARQ process corresponding to the Configured grant needs to be reserved, that is, when multiple sets of Configured grants are configured, multiple HARQ process resources need to be reserved, which causes a sharp reduction in the HARQ process that are available for the Grant-based, and even limits scheduling and reduces system efficiency.

SUMMARY

The embodiments of the disclosure provide a method for determining an HARQ process, a network device and a terminal.

In a first aspect, the embodiments of the disclosure provide a method for determining an HARQ process, which includes that: a terminal determines an HARQ process resource parameter; and the terminal determines an HARQ process resource for a transmission based on the HARQ process resource parameter; herein the transmission is a non-dynamic transmission.

In a second aspect, the embodiments of the disclosure provide a method for determining an HARQ process, which includes that: a network device configures an HARQ process resource parameter for a terminal, and sends the HARQ process resource parameter to the terminal; herein the HARQ process resource parameter is used for the terminal to determine a HARQ process resource for a transmission; and the transmission is a non-dynamic transmission.

In a third aspect, the embodiments of the disclosure provide a terminal, which includes a first processing unit and a second processing unit. The first processing unit is configured to determine an HARQ process resource parameter; and the second processing unit is configured to determine an HARQ process resource for a transmission based on the HARQ process resource parameter which is determined by the first processing unit; herein the transmission is a non-dynamic transmission.

In a fourth aspect, the embodiments of the disclosure provide a network device, which includes a configuration unit and a sending unit.

The configuration unit is configured to configure an HARQ process resource parameter for a terminal; and The sending unit is configured to send to the terminal the HARQ process resource parameter configured by the configuration unit; herein the HARQ process resource parameter is used for the terminal to determine an HARQ process resource for a transmission; and the transmission is a non-dynamic transmission.

In a fifth aspect, the embodiments of the disclosure provide a terminal, which includes a processor and a memory for storing a computer program, the processor is configured to call and run the computer program stored in the memory to execute the method for configuring the HARQ process.

In a sixth aspect, the embodiments of the disclosure provide a network device, which includes a processor and a memory for storing a computer program, the processor is configured to call and run the computer program stored in the memory to execute the method for configuring the HARQ process.

In a seventh aspect, the embodiments of the disclosure provide a chip to implement the method described above for configuring the HARQ process.

Specifically, the chip includes: a processor, configured to call and run a computer program from a memory to enable a device installed with the chip to execute the method for configuring the HARQ process according to the first aspect or the second aspect.

In an eighth aspect, the embodiments of the disclosure provide a computer readable storage medium, which is used to store a computer program that enables a computer to execute the method for configuring the HARQ process according to the first aspect or the second aspect.

In a ninth aspect, the embodiments of the disclosure provide a computer program product, which includes computer program instructions that enables a computer to execute the method for configuring the HARQ process according to the first aspect or the second aspect.

In a tenth aspect, the embodiments of the disclosure provide a computer program that when running on a computer, the computer program enables the computer to execute the method for configuring the HARQ process according to the first aspect or the second aspect.

The embodiments of the disclosure provide the method for determining the HARQ process, the network device and the terminal. The method includes that: the terminal determines the HARQ process resource parameter; and the terminal determines the HARQ process resource for the transmission based on the HARQ process resource parameter; herein the transmission is a non-dynamic transmission. By adopting the technical solution of the embodiments of the disclosure, the HARQ process resource for the transmission are determined by determining the HARQ process resource parameters and thereby making at least one configured grant correspond to the same HARQ process resource, reducing reservation for the HARQ resource and improving the system efficiency.

BRIEF DESCRIPTION OF THE DRAWINGS

The accompanying drawings illustrated herein are used to provide a further understanding of the present disclosure and constitute a part of the present disclosure. Exemplary embodiments of the present disclosure and the description thereof are used to explain the present disclosure and do not constitute an improper limitation to the present disclosure. In the accompanying drawings.

DETAILED DESCRIPTION

The technical solutions in the embodiments of the disclosure are described in the following with reference to the accompanying drawings in the embodiments of the disclosure. It is obvious that the described embodiments are some rather than all of the embodiments of the disclosure. All other embodiments obtained by a person of ordinary skill in the art based on the embodiments of the disclosure without creative efforts shall fall within the protection scope of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 1:
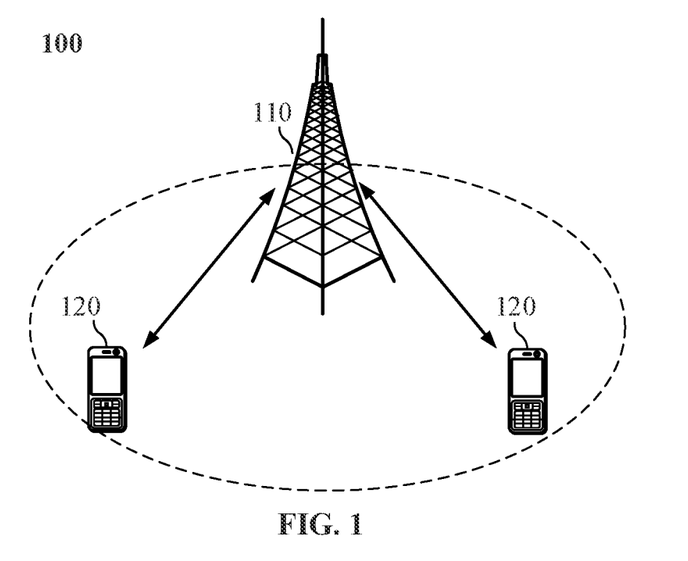
FIG. 1 is a schematic diagram of a communication system according to an embodiment of the disclosure.

FIG. 1 illustrates a communication system 100 to which the embodiments of the disclosure are applied. The communication system 100 may include a network device 110. The network device 110 may be a device communicating with a terminal 120 (or called a communication terminal or a terminal device). The network device 110 may provide communication coverage for a specific geographical region and may communicate with a terminal in the coverage. Optionally, the network device 100 may be a Base Transceiver Station (BTS) in the GSM system or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The communication system 100 further includes at least one terminal 120 within the coverage of the network device 110. The "terminal" used here includes, but is not limited to, connection via a wired line, such as a public switched telephone network (PSTN), digital subscriber line (Digital Subscriber Line, DSL), digital cable, and direct cable connection; and/or another data connection/network; and/or via a wireless interface, such as for cellular networks, wireless local area networks (WLAN), digital TV networks such as DVB-H networks, satellite networks, AM-FM Broadcast transmitter; and/or another terminal's device configured to receive/send communication signals: and/or Internet of Things (IoT) equipment. A terminal set to communicate through a wireless interface may be referred to as a "wireless communication terminal", a "wireless terminal" or a "mobile terminal". Examples of mobile terminals include, but are not limited to, satellite or cellular phones; Personal Communications System (PCS) terminals that can combine cellular radio phones with data processing, fax, and data communication capabilities; and may include radio telephones, pagers, Internet/Intranet access, web browsers, notepads, calendars, and/or global positioning systems. PDAs and/or Global Positioning System (GPS) receivers; and conventional lap-top and/or handheld receivers or other electronic devices that include radiotelephone transceivers. Terminal may refer to an access terminal, user equipment (User Equipment, UE), user unit, user station, mobile station, mobile station, remote station, remote terminal, mobile device, user terminal, terminal, wireless communication device, user agent, or user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Optionally, the terminals 120 may perform device to device (D2D) communication with each other.

Optionally, the 5G system or 5G network may also be referred to as a New Radio (NR) system or NR network.

A network device and two terminals are exemplarily illustrated in FIG. 1. Optionally, the communication system 100 may include multiple network devices and another number of terminal devices may be included in coverage of each network device. There are no limits made thereto in the embodiments of the disclosure.

Optionally, the communication system 100 may further include another network entity such as a network controller and a mobility management entity. There are no limits made thereto in the embodiments of the disclosure.

It should be understood that the devices with communication functions in the network/system in the embodiment of the disclosure may be referred to as communication devices. Taking the communication system 100 illustrated in FIG. 1 as an example, the communication devices may include the network device 110 and the terminal 120 that have communication capabilities, and the network device 110 and terminal 120 may be specific devices as described above and will not be described herein: the communication devices may also include other devices in the communication system 100, such as network controllers, mobile management entities, and other network entities, which are not limited in the embodiments of the disclosure.

It should be understood that terms "system" and "network" in this specification are usually interchangeably used in this specification. The term "and/or" in this specification is only an association relationship for describing associated objects, and represents that three relationships may exist, for example, A and/or B may represent the following three cases: A exists separately, both A and B exist, and B exists separately. In addition, the character "/" in this specification generally indicates an "or" relationship between the associated objects.

The technical solutions according to the embodiments of the present disclosure are mainly applied to 5G mobile communication system, of course, the technical solutions according to the embodiments of the present disclosure are not limited to 5G mobile communication system, and can also be applied to other types of mobile communication systems.

Figure 2:
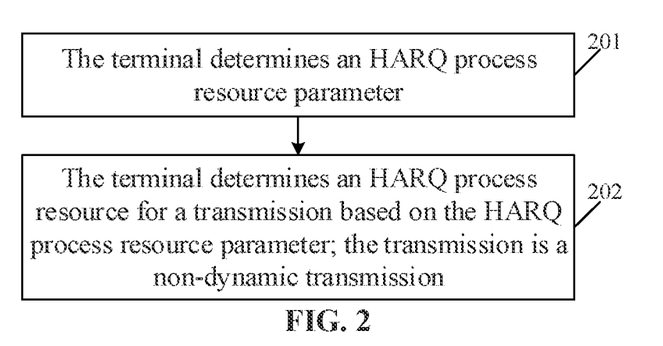
FIG. 2 is a schematic flowchart of a method for determining a HARQ process according to an embodiment of the disclosure.

The embodiment of the present disclosure provides a method for determining a HARQ process. FIG. 2 is a schematic flowchart of a method for determining a HARQ process according to an embodiment of the disclosure. As illustrated in FIG. 2, the method includes the following operations.

In 201, the terminal determines an HARQ process resource parameter.

In 202, the terminal determines an HARQ process resource for a transmission based on the HARQ process resource parameter, and the transmission is a non-dynamic transmission.

The HARQ process resource parameter in this embodiment is used to determine the HARQ process resource for the current transmission. In practical application, the HARQ process resource can be specifically represented by a HARQ process ID, and the HARQ process ID corresponding to a configured grant can be determined by a specific expression. The HARQ process resource parameter in this embodiment can be any parameter in the above expression, such as the HARQ ID offset.

In the embodiment, the determined HARQ process resource is the HARQ process resource for the current transmission; the current transmission is non-dynamic transmission. The non-dynamic transmission includes semi-static transmission and/or semi-persistent transmission. Here, the semi-static transmission may also be called the semi-static scheduling, which means that after the terminal obtains the scheduling information which is indicated by the network device and is used for semi-static transmission by using the Physical Downlink Control Channel (PDCCH), the terminal performs data transmission per regular cycle at the same position of time-frequency resources according to the scheduling information. The semi-persistent transmission may also be called semi-persistent scheduling (SPS), which means that: the terminal obtains the scheduling information which is indicated by the network device and is used for semi-persistent transmission via signaling, the scheduling information may include the period of semi-persistent transmission and other relevant parameters; then the terminal obtains a scheduling command for indicating the start of the semi-persistent transmission through PDCCH, herein the scheduling command is sent by the network device, and the terminal performs the data transmission according to the period based on the scheduling command. That is, the embodiments of the disclosure are applicable to the determination of HARQ process resources in such scenarios, the transmission is in the semi-static transmission and/or in the semi-persistent transmission.

In the embodiment of the disclosure, the determined HARQ process resource corresponds to at least one configured resource. As an example, the configured resource may be configured grant. In the embodiment, the HARQ process resource parameter is determined to determine the HARQ process resource for the transmission, so that at least one configured grant can correspond to the same HARQ process resource, which reduces the reservation for HARQ resource and improves the system efficiency.

In some embodiments, at least one configured resource corresponds to a configured resource group, and the determined HARQ process resource corresponds to a configured resource group. It can be understood that the determined HARQ process resources, which corresponding to the configured resources in a same configured resource group, are the same HARQ process resources.

As an application scenario, the same configured resource group corresponds to the same HARQ process resource, and different configured resource groups correspond to different HARQ process resources. The implementation is applicable to the scenario which supports the simultaneous transmission of at least two data in uplink. That is, by determining the HARQ process resource parameters corresponding to the different data to be sent simultaneously, the HARQ process resources (i.e., HARQ Process ID) for the transmission determined based on the HARQ process resource parameters are the same, thereby reducing the reservation for HARQ resource and improving system efficiency.

As another application scenario, the same configured resource group corresponds to the same HARQ process resource, and different configured resource groups correspond to the same HARQ process resource. The implementation is applicable to the scenario where only the same data is sent at the same time in the uplink. That is, for the configured resources with overlapping time-domain resources (including overlapping time-domain resources entirely or partially), by determining the HARQ process resource parameters corresponding to the data to be sent, the HARQ process resources (i.e., HARQ Process ID) for the transmission determined based on the HARQ process resource parameters are the same, thereby reducing HARQ resource reservation and improving system efficiency.

Optionally, the configured resource group may be referred to as a configured grant group. As an example, configured grants in a configured grant group have different starting symbols for a transmission opportunity where the transmission is located, other configured parameters are the same. A configured grant group corresponds to one kind of services or one class of services. For example, configured grant group 1 corresponds to the URLLC service, and configured grant group 2 corresponds to the Enhanced Mobile Broadband (eMBB) service. Of course, the division of service types is not limited to the above example, other dividing manners for service types may also be within the scope of protection of this embodiment.

In this embodiment, the terminal determines the HARQ process resource parameter, which includes that: the terminal determines the HARQ process resource parameter based on configuration from a network device or a default manner.

In an optional embodiment of the present disclosure, the terminal determines the HARQ process resource parameter, which includes that: the terminal obtains a first HARQ process resource parameter which is configured by a network device: herein the first HARQ process resource parameter corresponds to each configured grant.

In this embodiment, the HARQ process resource parameter (recorded as the first HARQ process resource parameter in this embodiment) used to determine the HARQ process resource for transmission is configured by the network device. As an implementation, if the configured grant corresponds to a configured grant group, the network device can configure the first HARQ process resource parameter, and the first HARQ process resource parameters corresponding to each configured grant in the configured grant group are different, such that the HARQ process resource corresponding to each configured grant in the determined configured grant group are the same. Herein, as an example, the first HARQ process resource parameter may be HARQ ID offset.

For example, if it is determined that the HARQ process resource is represented by the HARQ process identity, the expression for determining the HARQ process identity is illustrated in expression (1):

$$\text{HARQ Process ID} = [\text{floor}(\text{CURRENT\_symbol}/\text{periodicity}) + \text{HARQ ID offset}] \text{ modulo nrofHARQ-Processes} \quad (1),$$

where the HARQ Process ID denotes the HARQ process identity, the CURRENT_symbol denotes the time-domain position of the transmission; Periodicity denotes the period; the HARQ ID offset denotes the HARQ identity offset; nrofHARQ-Processes denotes the number of HARQ processes for configured grant; Floor denotes round down; modulo denotes modulo operation.

Assuming that the starting symbol of a configured grant 1 is T1, a length of time-domain symbol is L1, a period is P1. HARQ ID offset=K1, nrofHARQ-Processes=N1; the starting symbol of a configured grant 2 is T2, a length of time-domain symbol is L1, a period is P2, HARQ ID offset=K2, nrofHARQ-Processes=N1;

In the first application scenario above, if T1=a, K1=b and T2=a+1, K2=b-1. For example, if P1=14, a=1, b=2, N1=2 and L1=2, at moment T2, the HARQ process on configured grant 1 is 0, and the HARQ process on configured grant 2 is 0.

In the second application scenario above, if T1=a, K1=b and T2=a+1, K2=b-1. For example, if T1=1, P1=14, K1=2, N1=4; T2=2, P2=28, K2=1 and N2=4, at moment T2, the HARQ process on configured grant 1 is 0, and the HARQ process on configured grant 2 is 0.

In an optional embodiment of the present disclosure, the terminal determines the HARQ process resource parameter, which includes that: the terminal determines the HARQ process resource parameter based on a starting symbol of a transmission opportunity where the transmission for a configured grant is located.

In this implementation, the HARQ process resource parameter used to determine the HARQ process resource for the transmission is determined by the terminal in a predetermined manner (or called a protocol agreed manner). This implementation is applicable to the second application scenario described above, that is, the scenario where the uplink is limited to the same data transmission at the same moment. Since the starting symbol of the transmission opportunity where the transmission of the configured grant is located is different, in this embodiment, the terminal determines the HARQ process resource parameter based on the starting symbol of the transmission opportunity where the transmission of the configured grant is located. Specifically, the terminal can determine the HARQ process resource parameter based on the difference between the starting symbols of the transmission opportunities where the transmissions of the two configured grants are located respectively. Herein, as an example, the HARQ process resource parameter may be HARQ ID offset: the difference between the HARQ ID offsets respectively corresponding to the two configured grants may be determined by the difference between the starting symbols of the transmission opportunities where the transmissions of corresponding configured grants respectively are located, that is, a difference of HARQ ID offsets=a difference of initial symbols.

For example, if it is determined that the HARQ process resource is represented by the HARQ process ID, the expression for determining the HARQ process ID is illustrated in the above expression (1), assuming that the starting symbol of configured grant 1 is T1, and the starting symbol of configured grant 2 is T2, T2-T1=deltaT, the HARQ ID offset of the configured grant 1 is 0, and the HARQ ID offset of the configured grant 2 is deltaT.

In an optional embodiment of the present disclosure, the terminal determines the HARQ process resource parameter, which includes that: the terminal obtains a second HARQ process resource parameter which is configured by a network device, the second HARQ process resource parameter corresponding to configured grants in a configured grant group; and the terminal determines the third HARQ process resource parameter based on a predetermined manner and the second HARQ process resource parameter, the third HARQ process resource parameter corresponding to each configured grant in the configured grant group.

Here, the terminal determines the third HARQ process resource parameter based on the predetermined manner and the second HARQ process resource parameter, which includes that: the terminal determines the third HARQ process resource parameter based on a starting symbol of a transmission opportunity where the transmission of the configured grant is located and the second HARQ process resource parameter.

In this embodiment, the HARQ process resource parameters which are used to determine the HARQ process resource for the transmission are partially configured by the network device. It can be understood that in this embodiment, the HARQ process resource for the transmission is determined based on the third HARQ process resource parameter; and the second HARQ process resource parameter used to determine the third HARQ process resource parameter is configured by the network device. As an implementation, if the configured grant corresponds to a configured grant group, the network device can configure a second HARQ process resource parameter, and each configured grant in the configured grant group shares the second HARQ process resource parameter, that is, each configured grants in the configured grant group uses the same second HARQ process resource parameter. On the other hand, the terminal determines the third HARQ process resource parameter based on the starting symbol of the transmission opportunity where the transmission of the configured grant is located and the second HARQ process resource parameter, specifically, the third HARQ process resource parameter may be determined based on the difference between the starting symbols of the transmission opportunities where the transmissions of two configured grants are located respectively and the second HARQ process resource parameter. Herein, as an example, the third HARQ process resource parameter may be HARQ ID offset; and the second HARQ process resource parameter may be a starting position of HARQ ID offset (HARQ ID offset start); then:

$$\text{HARQ ID offset} = \text{HARQ ID offset start} + \text{suboffset} \quad (2),$$

where the suboffset is the sub-offset, which indicates the offset of the starting position of the HARQ ID offset; suboffset can be determined by the starting symbol of the transmission opportunity where the transmission of the configured grant is located, specifically, suboffset can be determined based on the difference between starting symbols of the transmission opportunities where the transmissions of the two configured grants are located respectively. i.e., the difference of suboffsets=the difference of starting symbols.

For example, the starting symbol of configured grant 1 is T1, and the starting symbol of configured grant 2 is T2. T2−T1=deltaT, then suboffset of configured grant 1 is 0 and suboffset of configured grant 2 is deltaT. The HARQ ID offset can be determined by the expression (2), and the HARQ process ID is further determined according to the above expression (1) to determine the HARQ process resource.

It can be understood that this implementation is applicable to the first application scenario and the second application scenario mentioned above. Configured grant 1 and configured grant 2 may be configured grants belonging to the same configured grant group, or may not be limited to the configured grant of the configured grant group.

In an optional embodiment of the present disclosure, the terminal determines the HARQ process resource parameter, which includes that: the terminal obtains a fourth HARQ process resource parameter and a fifth HARQ process resource parameter which are configured by a network device, the fourth HARQ process resource parameter corresponding to configured grants in the configured grant group and the fifth HARQ process resource parameter corresponding to each configured grant in the configured grant group; and the terminal determines the sixth HARQ process resource parameter based on the fourth HARQ process resource parameter and the fifth HARQ process resource parameter.

In this implementation, the HARQ process resource parameters (including the fourth HARQ process resource parameter and the fifth HARQ process resource parameter) used to determine the HARQ process resource for the transmission are configured by the network device. As an implementation, if the configured grant corresponds to a configured grant group, the network device may configure the fourth HARQ process resource parameter, and each configured grant in the configured grant group corresponds to the same fourth HARQ process resource parameter, that is, each configured grant in the configured grant group shares the fourth HARQ process resource parameter; and each configured grant in the configured grant group corresponds to a different fifth HARQ process resource parameter, so that each configured grant in the determined configured grant group corresponds to the same HARQ process resource. Herein, as an example, the fourth HARQ process resource parameter may be a start position of HARQ ID offset (HARQ ID offset start), and the fifth HARQ process resource parameter may be the suboffset which represents the offset of the start position of the HARQ ID offset. HARQ ID offset can be determined based on the HARQ ID offset start and suboffset, and can be specifically determined with reference to the above expression (2).

This implementation is applicable to the first application scenario described above, that is, the scenario where the uplink supports at least two data which are transmitted simultaneously. For example, if a HARQ ID offset start is configured for each configured grant group, and a different suboffset is configured for each configured grant within the configured grant group, the above expression (2) can be used to determine the HARQ ID offset, and the HARQ process ID can be further determined based on the above expression (1), then the HARQ process resource can be determined.

Adopting the technical solution of the embodiment of the disclosure, the HARQ process resource for the transmission can be determined by determining the HARQ process resource parameters, so that at least one configured grant corresponds to the same HARQ process resource. For example, in the scenario where the uplink supports multiple data transmissions at the same time, the same configured grant group corresponds to the same HARQ process resource, and different configured grant groups correspond to different HARQ process resources; in the scenario where the uplink only supports one data transmission at the same time, the same configured grant group corresponds to the same HARQ process resource, different configured grant groups correspond to the same HARQ process resources, that is, the configured grants with overlapping time-domain resources correspond to the same HARQ process resource, which reduces the reservation for HARQ resource and improves the system efficiency.

Figure 3:
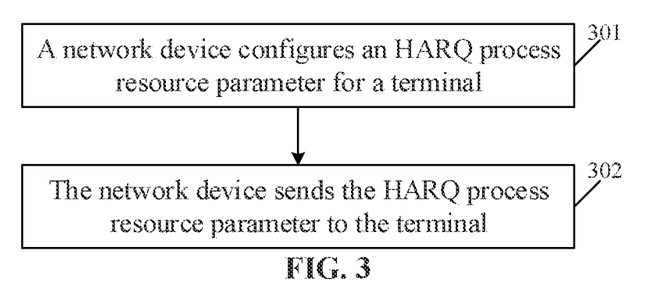
FIG. 3 is another schematic flowchart of a method for determining a HARQ process according to an embodiment of the disclosure.

Based on the preceding embodiments, the embodiment of present disclosure also provides a HARQ process determination method. FIG. 3 is another schematic flowchart of a method for determining a HARQ process according to the embodiment of the disclosure; as illustrated in FIG. 3, the method includes the following operations.

In 301: a network device configures an HARQ process resource parameter for a terminal.

In 302: the network device sends the HARQ process resource parameter to the terminal.

Herein, the HARQ process resource parameter is used for the terminal to determine an HARQ process resource for a transmission: and the transmission is a non-dynamic transmission.

In an optional embodiment of the present disclosure, the network device configures the HARQ process resource parameter for the terminal, which includes that: the network device configures a first HARQ process resource parameter for the terminal; each configured grant corresponding to the first HARQ process resource parameter.

In an optional embodiment of the present disclosure, the network device configures the HARQ process resource parameter for the terminal, which includes that: the network device configures a second HARQ process resource parameter for the terminal: the second HARQ process resource parameter corresponding to configured grants in a configured grant group.

In an optional embodiment of the present disclosure, the network device configures the HARQ process resource parameter for the terminal, which includes that: the network device configures a fourth HARQ process resource parameter and a fifth HARQ process resource parameter for the terminal; the fourth HARQ process resource parameter corresponding to configured grants in a configured grant group, and the fifth HARQ process resource parameter corresponding to each configured grant in the configured grant group.

The relevant descriptions in this embodiment can be referred to the relevant descriptions in the foregoing method embodiments corresponding to the terminal, which will not be repeated here.

Adopting the technical solution of the embodiment of the disclosure, the HARQ process resource for the transmission can be determined by determining the HARQ process resource parameters, so that at least one configured grant corresponds to the same HARQ process resource. For example, in the scenario where the uplink supports multiple data transmissions at the same time, the same configured grant group corresponds to the same HARQ process resource, and different configured grant groups correspond to different HARQ process resources: in the scenario where the uplink only supports one data transmission at the same time, the same configured grant group corresponds to the same HARQ process resource, different configured grant groups correspond to the same HARQ process resources, that is, the configured grants with overlapping time-domain resources correspond to the same HARQ process resource, which reduces the reservation for HARQ resource and improves the system efficiency.

Figure 4:
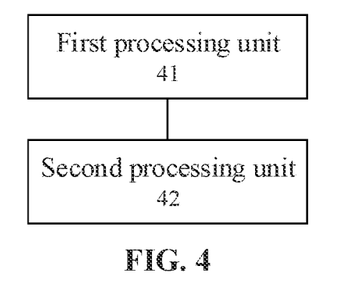
FIG. 4 is a schematic structural composition diagram of a terminal according to an embodiment of the disclosure.

Based on the preceding embodiment, the present disclosure embodiment also provides a terminal. FIG. 4 is a schematic structural composition diagram of a terminal according to an embodiment of the disclosure; as illustrated in FIG. 4, the terminal includes a first processing unit 41 and a second processing unit 42.

The first processing unit 41 is configured to determine a HARQ process resource parameter.

The second processing unit 42 is configured to: determine an HARQ process resource for a transmission based on the HARQ process resource parameter which is determined by the first processing unit 41; herein the transmission is a non-dynamic transmission.

In an optional embodiment of the present disclosure, the first processing unit 41 is configured to determine the HARQ process resource parameter based on configuration from a network device or a default manner.

Figure 5:
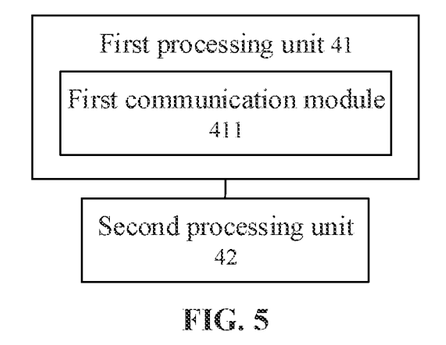
FIG. 5 is another schematic structural composition diagram of a terminal according to embodiment of the disclosure.

In an optional embodiment of the present disclosure, as illustrated in FIG. 5, the first processing unit 41 includes a first communication module 411, and the first communication module is configured to obtain a first HARQ process resource parameter configured by a network device, each configured grant corresponding to the first HARQ process resource parameter.

In an optional embodiment of the present disclosure, the first processing unit 41 is configured to determine the HARQ process resource parameter based on a starting symbol of a transmission opportunity where the transmission for a configured grant is located.

Figure 6:
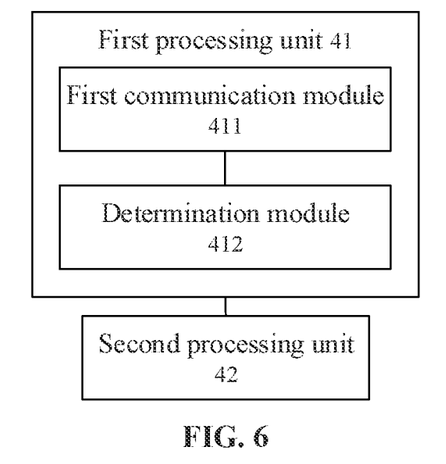
FIG. 6 is another schematic structural composition diagram of a terminal according to embodiment of the disclosure.

In an optional embodiment of the present disclosure, as illustrated in FIG. 6, the first processing unit 41 includes a first communication module 411 and a determination module 412.

The first communication module 411 is configured to obtain a second HARQ process resource parameter which is configured by a network device; the second HARQ process resource parameter corresponding to configured grants in a configured grant group.

The determination module 412 is configured to determine the third HARQ process resource parameter based on a predetermined manner and the second HARQ process resource parameter; the third HARQ process resource parameter corresponding to each configured grant in the configured grant group.

In an optional embodiment of the present disclosure, the determination module 412 is configured to determine the third HARQ process resource parameter based on a starting symbol of a transmission opportunity where the transmission of the configured grant is located and the second HARQ process resource parameter.

In an optional embodiment of the present disclosure, as illustrated in FIG. 6, the first processing unit 41 includes a first communication module 411 and a determination module 412.

The first communication module 411 is configured to obtain a fourth HARQ process resource parameter and a fifth HARQ process resource parameter which are configured by a network device, the fourth HARQ process resource parameter corresponding to configured grants in the configured grant group; and the fifth HARQ process resource parameter corresponding to each configured grant in the configured grant group.

The determination module 412 is configured to determine the sixth HARQ process resource parameter based on the fourth HARQ process resource parameter and the fifth HARQ process resource parameter which are obtained by the first communication module 411.

It should be noted that the terminal provided by the above embodiments, when determining the HARQ process, is only illustrated by the division of each program module as described above. In practical application, the above processing can be assigned to different program modules according to the needs, i.e., the internal structure of the terminal is divided into different program modules to complete all or part of the above described processing. In addition, the terminal provided by the above example is of the same idea as the method embodiments for determining the HARQ process, and its specific implementation process is detailed in the method embodiments, which will not be repeated here.

Figure 7:
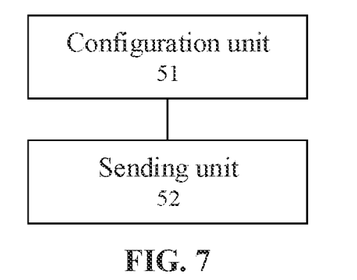
FIG. 7 is a schematic structural composition diagram of a network device according to an embodiment of the disclosure.

Based on the preceding embodiments, the present disclosure embodiment also provides a network device. FIG. 7 is a schematic structural composition diagram of a network device according to an embodiment of the disclosure; as illustrated in FIG. 7, the network device includes a configuration unit 51 and a sending unit 52.

The configuration unit 51 is configured to configure an HARQ process resource parameter for a terminal.

The sending unit 52 is configured to send the HARQ process resource parameter to the terminal.

Herein the HARQ process resource parameter is used for the terminal to determine an HARQ process resource for a transmission; and the transmission is a non-dynamic transmission.

In an optional embodiment of the present disclosure, the configuration unit 51 is configured to configure a first HARQ process resource parameter for the terminal; each configured grant corresponding to the first HARQ process resource parameter.

In an optional embodiment of the present disclosure, the configuration unit 51 is configured to configure a second HARQ process resource parameter for the terminal; the second HARQ process resource parameter corresponding to configured grants in a configured grant group.

In an optional embodiment of the present disclosure, the configuration unit 51 is configured to configure a fourth HARQ process resource parameter and a fifth HARQ process resource parameter for the terminal, the fourth HARQ process resource parameter corresponding to configured grants in a configured grant group; and the fifth HARQ process resource parameter corresponding to each configured grant in the configured grant group.

It should be noted that the network device provided by the above embodiments, when determining the HARQ process, is only illustrated by the division of each program module as described above. In practical application, the above processing can be assigned to different program modules according to the needs. i.e., the internal structure of the network device is divided into different program modules to complete all or part of the above described processing. In addition, the network device provided by the above example is of the same idea as the method embodiments for determining the HARQ process, and its specific implementation process is detailed in the method embodiments, which will not be repeated here.

Figure 8:
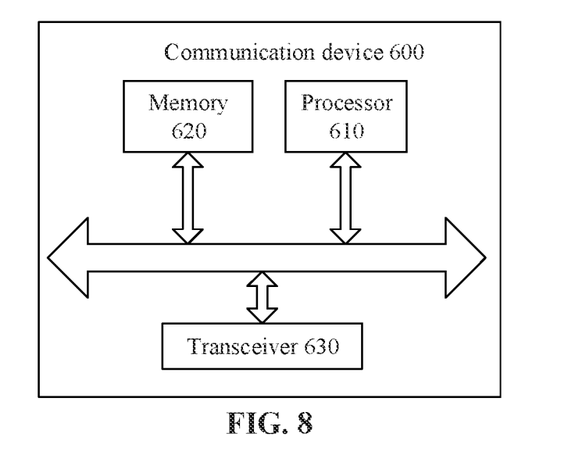
FIG. 8 is a schematic hardware structural composition diagram of a communication device according to an embodiment of the disclosure.

FIG. 8 is a schematic structure diagram of a communication device according to an embodiment of the disclosure. The communication device in the embodiment of the present disclosure may be a terminal or a network device. The communication device 600 illustrated in FIG. 8 includes a processor 610. The processor 610 may call and run a computer program from the memory to execute the method in the embodiments of the present disclosure.

Optionally, as illustrated in FIG. 8, the communication device 600 may further include a memory 620. Here, the processor 610 may call and run a computer program from the memory to execute the method in the embodiments of the present disclosure.

Here, the memory 620 may be a separate device from the processor 610, or may be integrated in the processor 610.

Optionally, as illustrated in FIG. 8, the communication device 600 may also include a transceiver 630, and the processor 610 may control the transceiver 630 to communicate with other devices, specifically, it may send information or data to other devices, or receive information or data sent by other devices.

Herein, the transceiver 630 may include a transmitter and a receiver. The transceiver 630 may further include an antenna, and the number of antennas may be one or more.

Optionally, the communication device 600 may specifically be a terminal or a network device in an embodiment of the disclosure, and the communication device 600 may implement the corresponding process implemented by the terminal or the network device in each method of the embodiments of the disclosure. For brevity, details are not described herein again.

Figure 9:
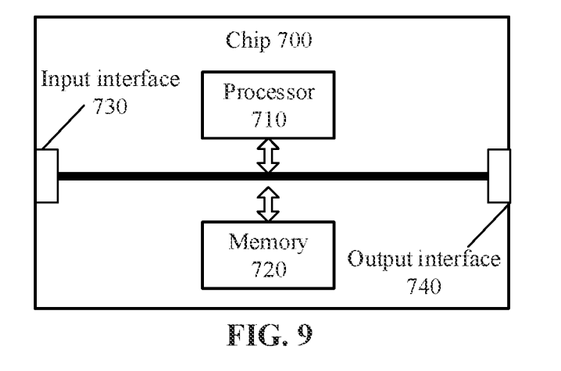
FIG. 9 is a schematic structural diagram of a chip according to an embodiment of the disclosure.

FIG. 9 is a schematic structural diagram of a chip according to an embodiment of the disclosure. The chip 700 illustrated in FIG. 9 includes a processor 710, the processor 710 may call and run a computer program from the memory to execute the method in the embodiments of the present disclosure.

Optionally, as illustrated in FIG. 9, the chip 700 may further include a memory 720. Here, the processor 710 may call and run a computer program from the memory 720 to execute the method in the embodiments of the present disclosure.

Here, the memory 720 may be a separate device from the processor 710, or may be integrated in the processor 710.

Optionally, the chip 700 may further include an input interface 730. Here, the processor 710 may control the input interface 730 to communicate with other devices or chips, specifically, the input interface may obtain information or data sent by other devices or chips.

Optionally, the chip 700 may further include an output interface 740. Optionally, the processor 710 may control the output interface 740 to communicate with other devices, specifically, the output interface may send information or data to other devices or chips.

Optionally, the chip can be applied to the terminal or network device in the embodiment of this disclosure, and the chip may implement the corresponding process implemented by the terminal or the network device in each method of the embodiments of the disclosure. For brevity, details are not described herein again.

It should be understood that the chips mentioned in the embodiments of the present disclosure may also be referred to as system-level chips, system chips, chip system, or system-on-chip, or the like.

Figure 10:
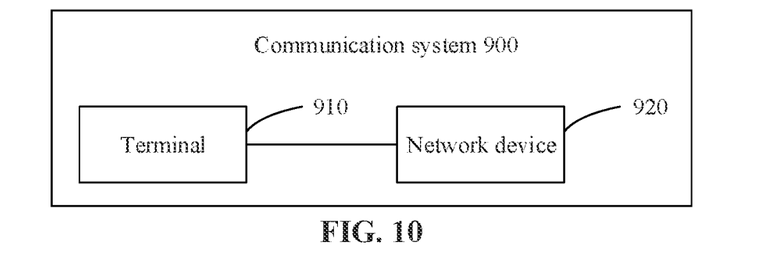
FIG. 10 is a schematic block diagram of a communication system according to an embodiment of the disclosure.

FIG. 10 is a schematic block diagram of a communication system according to an embodiment of the disclosure. As illustrated in FIG. 10, the communication system 900 includes a terminal 910 and a network device 920.

Here, the terminal 910 may be used to implement the corresponding functions implemented by the terminal in the foregoing method, and the network device 920 may be used to implement the corresponding functions implemented by the network device in the foregoing method. For brevity, details are not described herein again.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiment of the disclosure may be implemented or executed. The universal processor may be a microprocessor or the processor may also be any conventional processor and the like. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is exemplarily but unlimitedly described that memory which according to the embodiments of the disclosure in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM).

That is, the memory in the embodiments of the disclosure is intended to include, but is not limited to, these and any other suitable types of memory.

The embodiments of the present disclosure also provide a computer-readable storage medium for storing computer programs.

Optionally, the computer-readable storage medium can be applied to the terminal or network device in the embodiment of this disclosure, and the computer program causes the computer to execute the corresponding process implemented by the terminal or network device according to each method of the embodiments of this disclosure. For the sake of brevity, details are not described herein again.

Embodiments of the present disclosure also provide a computer program product including computer program instructions.

Optionally, the computer program product may be applied to the terminal or network device in the embodiments of the present disclosure, and the computer program instructions cause the computer to execute the corresponding processes implemented by the terminal or network device according to each method of the embodiments of the present disclosure. For the sake of brevity, details are not described herein again.

The embodiment of the disclosure also provides a computer program.

Optionally, the computer program can be applied to the terminal or network device in the embodiments of the present disclosure. When the computer program runs on the computer, the computer executes the corresponding implementation of the terminal or network device in each method of the embodiments of the present disclosure. For the sake of brevity, details are not described herein again.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a sensing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The above-mentioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a Hybrid Automatic Repeat reQuest (HARQ) process, comprising:
   determining, by a terminal, an HARQ process resource parameter; and
   determining, by the terminal, an HARQ process resource for a transmission based on the HARQ process resource parameter; wherein the transmission comprises at least one of a semi-static transmission or a semi-persistent transmission,
   wherein determining, by the terminal, the HARQ process resource parameter comprises:
   obtaining, by the terminal, a second HARQ process resource parameter which is configured by a network device; and
   determining, by the terminal, a third HARQ process resource parameter based on a starting symbol of a transmission opportunity where transmission of one configured grant is located and the second HARQ process resource parameter.

2. The method of claim 1, wherein determining, by the terminal, the HARQ process resource parameter comprises:
   determining, by the terminal, the HARQ process resource parameter based on configuration from a network device or a default manner.

3. The method of claim 1, wherein determining, by the terminal, the HARQ process resource parameter comprises:
   obtaining, by the terminal, flail first HARQ process resource parameters which are configured by a network device, wherein each of the first HARQ process resource parameters corresponds to a respective one of the configured grants in the configured grant group.

4. The method of claim 1, wherein the determined HARQ process resource corresponds to at least one configured grant.

5. The method of claim 1, wherein determining, by the terminal, the HARQ process resource parameter comprises:
determining, by the terminal, the HARQ process resource parameter based on a starting symbol of a transmission opportunity where the transmission for a configured grant is located.

6. The method of claim 1, wherein the HARQ process resource parameter is a HARQ ID offset.

7. A method for determining a Hybrid Automatic Repeat reQuest (HARQ) process, comprising:
configuring, by a network device, an HARQ process resource parameter for a terminal, and sending the HARQ process resource parameter to the terminal;
wherein the HARQ process resource parameter is used for the terminal to determine an HARQ process resource for a transmission; and the transmission comprises at least one of a semi-static transmission or a semi-persistent transmission,
wherein configuring, by the network device, the HARQ process resource parameter for the terminal comprises:
configuring, by the network device, a second HARQ process resource parameter for the terminal,
wherein the second HARQ process resource parameter is configured to enable the terminal to determine a third HARQ process resource parameter, wherein the third HARQ process resource parameter is determined based on a starting symbol of a transmission opportunity where transmission of one configured grant is located and the second HARQ process resource parameter.

8. The method of claim 7, wherein configuring, by the network device, the HARQ process resource parameter for the terminal comprises:
configuring, by the network device, first HARQ process resource parameters for the terminal, wherein each of the first HARQ process resource parameters corresponds to a respective one of the configured grants in the configured grant group.

9. The method of claim 7, wherein the determined HARQ process resource corresponds to at least one configured grant.

10. The method of claim 7, wherein the HARQ process resource parameter is a HARQ ID offset.

11. A terminal, comprising:
a processor, wherein the processor is configured to:
determine a Hybrid Automatic Repeat reQuest (HARQ) process resource parameter; and
determine an HARQ process resource for a transmission based on the HARQ process resource parameter which is determined by the processor; wherein the transmission comprises at least one of a semi-static transmission or a semi-persistent transmission,
wherein the processor is further configured to:
obtain a second HARQ process resource parameter which is configured by a network device; and
determine a third HARQ process resource parameter based on a starting symbol of a transmission opportunity where transmission of one configured grant is located and the second HARQ process resource parameter.

12. The terminal of claim 11, wherein the processor is further configured to determine the HARQ process resource parameter based on configuration from a network device or a default manner.

13. The terminal of claim 11, further comprising a transceiver, wherein the transceiver is configured to obtain first HARQ process resource parameters configured by a network device, wherein each of the first HARQ process resource parameters corresponds to a respective one of the configured grants in the configured grant group.

14. The terminal of claim 11, wherein the processor is further configured to determine the HARQ process resource parameter based on a starting symbol of a transmission opportunity where the transmission for a configured grant is located.

15. A network device, comprising:
a processor, configured to configure a Hybrid Automatic Repeat reQuest, HARQ, process resource parameter for a terminal; and
a transceiver, configured to send to the terminal the HARQ process resource parameter configured by the processor; wherein the HARQ process resource parameter is used for the terminal to determine an HARQ process resource for a transmission; and the transmission comprises at least one of a semi-static transmission or a semi-persistent transmission,
wherein the processor is further configured to:
configure a second HARQ process resource parameter for the terminal,
wherein the second HARQ process resource parameter is configured to enable the terminal to determine a third HARQ process resource parameter based on a starting symbol of a transmission opportunity where transmission of one configured grant is located and the second HARQ process resource parameter.

16. The network device of claim 15, wherein the processor is configured to configure first HARQ process resource parameters for the terminal, wherein each of the first HARQ process resource parameters corresponds to a respective one of the configured grants in the configured grant group.

* * * * *